United States Patent [19]

Shinohara

[11] Patent Number: 5,859,108

[45] Date of Patent: Jan. 12, 1999

[54] POLYACETAL COMPOSITION AND ITS MOLDED PARTS

[75] Inventor: Kenichi Shinohara, Yokohama, Japan

[73] Assignee: E. I. du Pont de Nemours and Company, Wilmington, Del.

[21] Appl. No.: 718,327

[22] Filed: Sep. 25, 1996

[30] Foreign Application Priority Data

Mar. 29, 1994 [JP] Japan ........................................ 7-59045
Mar. 9, 1995 [JP] Japan ........................................ 8-49864

[51] Int. Cl.$^6$ ................ C08K 3/18; C08K 3/22; C08K 3/34
[52] U.S. Cl. .................... 524/430; 524/431; 524/493; 524/612
[58] Field of Search .................... 524/430, 431, 524/493, 612

[56] References Cited

U.S. PATENT DOCUMENTS

| 4,624,812 | 11/1986 | Farrow et al. | 524/443 |
| 5,145,900 | 9/1992 | Sterzel et al. | 524/437 |
| 5,155,158 | 10/1992 | Kim | 524/438 |

FOREIGN PATENT DOCUMENTS

| 2609705 | 7/1988 | France . |
| 4122765 | 4/1992 | Japan . |

*Primary Examiner*—Kriellion S. Morgan

[57] ABSTRACT

Molded parts having good frictional wear resistance are provided by a polyacetal composition containing 0.25–15 parts by weight of fine spherical ceramic powder of 1.0 $\mu$m or smaller average grain size to 100 parts by weight of polyacetal resin.

2 Claims, No Drawings

POLYACETAL COMPOSITION AND ITS MOLDED PARTS

BACKGROUND OF THE INVENTION

1. Field of the Invention

This invention relates to a polyacetal composition which is suitable for molded parts of good wear-resistance that can be used suitably under the condition of repeated friction under high load, regardless of the material of the mating member, and its molded parts.

2. Description of the Related Art

Polyacetal resin has excellent mechanical properties and heat resistance, especially wear-resistance, and it is in wide use as sliding members. However, in case of its use for mechanical parts, such as gears, rollers, bearings, door parts, etc., under the condition of repeated friction under heavy load, improvement of wear-resistance against repeated operations is desired. Also, recently, members with which it comes into contact are becoming diversified, such as plastics, composite plastics or ceramic materials, in addition to conventional metallic materials.

Therefore, conventionally, for the purpose of further improvement of wear-resistance of polyacetal resins, inorganic solid lubricants, such as $MoS_2$, graphite, etc.; liquid or semi-solid lubricants, such as petroleum, synthetic lubricants, aliphatic alcohols or their esters, etc., or addition of polyolefin fine powder of 500,000 or higher molecular weight are used.

However, wear-resistance of this material varies greatly depending on the material of the mating member and it can be wear-resistant to some mating members, but not wear-resistant to other mating members, therefore a lubricant must be selected depending on the material of the mating member.

DETAILED DESCRIPTION

The purpose of this invention is to offer a polyacetal composition and its molded parts that can realize molded parts of good frictional wear-resistance which can be used suitably under the condition of repeated friction under high load, regardless of the material of the mating part.

Embodiment No. 1 of this invention, that achieves such a purpose, is characterized by a content of 0.25–15 parts by weight of fine spherical ceramic powder of 1.0 μm or smaller average grain size to 100 parts by weight of polyacetal resin.

Embodiment No. 2 of this invention is characterized by molded parts made by using a polyacetal composition containing 0.25–15 parts by weight of fine spherical ceramic powder of 1.0 μm or smaller average grain size to 100 parts by weight of polyacetal resin.

The polyacetal resin referred to in this invention includes, in addition to polyacetal homopolymer, polyacetal copolymer with cyclic ether, cyclic polymal [phonetic]. However, the copolymer can have poorer physical properties (tensile properties, Izod impact properties, bending/compression properties, etc.) due to the addition of lubricant, therefore, use of a polyacetal homopolymer is preferable.

The fine ceramic powder used in this invention is represented by, for example, silica, alumina, etc., but diamond, silicon carbide, silicon nitride, zirconia, etc., and, in addition, more generally available lime, cement, silica glass, etc., can also be included.

Here, the fine ceramic powder is fine spherical ceramic powder of 1.0 μm or smaller average grain size; compounding of fine nonspherical ceramic powder does not improve the frictional wear properties. Also, compounding of fine ceramic powder of 1.0 μm or larger grain size degrades the impact resistance, etc., of the polyacetal resin.

The amount of fine ceramic powder incorporated is 0.25–15 parts by weight to 100 parts by weight of polyacetal resin, 0.5–5 parts by weight being preferred. At 0.25 parts by weight or less, the frictional wear resistance is not improved and at 15 parts by weight or more, the mechanical properties of polyacetal are degraded and, in addition, its machinability is degraded.

The fine ceramic powder used in this invention can be manufactured by high-temperature evaporation of fine metal powder and contacting with oxygen in the gaseous state for self-combustion or by pulverization of ceramic material.

The known method can be used for manufacturing the polyacetal composition of this invention, where the contents are mechanically blended by extruder, kneader, etc.

The polyacetal composition of this invention can have various additives added for the polyacetal resin, such as, for example, stabilizer, nucleating agent, antistatic agent, flame retardant, coloring agent, lubricant, etc.

Also, the molded parts of this invention are molded by use of the said polyacetal composition and injection molder, etc., for example. Specifically, these are molded parts used in electrical/electronic devices, especially audio devices, or office equipment, such as copying machines, printers, etc., for example, gears, rollers, cams, switches, etc.

The fine spherical ceramic powder contained in the polyacetal composition of this invention disperses uniformly in melt-mixing and injection molding and molded parts made from it are suitable for use under highly-loaded repeating friction, regardless of the material of the mating member.

EXAMPLES

This invention is explained below, in specific detail, with the aid of the following examples.

As shown in Table 1, fine ceramic powder is added to polyacetal resin and melt-mixed at 200°–210° C. resin temperature using a dual-screw extruder (Toshiba Tem-35), then cooled with water and cut into resin pellets.

The resin pellets are molded into 75 mm×125 mm×3.2 mm plate side test pieces using an injection molding machine (Toshiba IS-220EN) for the frictional wear test of the moldings. Meanwhile, polyacetal or steel is used to make a cap-shaped cap-side test piece as specified in JIS K 7218 (Type A), for the frictional wear test.

Frictional wear test

The frictional wear test was done according to the following test method.

Suzuki's friction wear tester (Takachino-Seiki Co.) was used, according to JIS K 7218 (Type A).

The test was (I) at a relatively light load (weight 10 kg, speed 10 cm/sec, driving distance 1 km), and at (II) heavy load (weight 50 kg, speed 5 cm/sec, driving distance 0.5 km) and the amount of wear was calculated from the difference in weight of the plate before and after each test to obtain the frictional coefficient below.

Frictional coefficient=amount of wear/driving distance (mg/km)

Reciprocation wear test

The reciprocation wear test was conducted as follows.

After the dumb-bell test piece (test piece A), according to ASTM D 628 (type A), was measured for initial weight ($W_0$g), it is fixed horizontally on a reciprocating table.

Meanwhile, the test piece which is the mating member, measuring 25.0 mm×8.0 mm×3.2 mm, according to ASTM

TABLE 1

|  | poly-acetals | ceramic fine powder | amount added (parts by weight) | wear test condition (I) mg/km | wear test condition (II) mg/km | reciprocation wear test condition (III) g | reciprocation wear test condition (IV) g | tensile break elongation % |
|---|---|---|---|---|---|---|---|---|
| Practical Example 1 | A 100 | silica A | 0.5 | 0.30 | 0.9 | 15.6 | 8.2 | 37.7 |
| Practical Example 2 | B 100 | silica A | 1.0 | 0.40 | 0.8 | 6.5 | 2.0 | 35.0 |
| Practical Example 3 | A 50 B 50 | silica A | 0.5 | 0.40 | 0.75 | 8.0 | 3.5 | 30.0 |
| Practical Example 4 | A 100 | silica A | 2.0 | 0.70 | 1.8 | 10.2 | 4.0 | 8.0 |
| Practical Example 5 | A 100 | silica A | 1.0 | — | — | 12.0 | 7.5 | 24.2 |
| Practical Example 6 | A 100 | alumina | 1.0 | — | — | 12.7 | 10.1 | 20.7 |
| Comparative Example 1 | A 100 | — | — | 0.80 | 2.5 | 35.0 | 17.0 | 48.0 |
| Comparative Example 2 | B 100 | — | — | 0.70 | 2.1 | 22.0 | — | 45.0 |
| Comparative Exampie 3 | A 100 | silica B | 0.5 | 0.50 | 1.8 | 17.5 | 14.4 | 20.2 |
| Comparative Example 4 | A 100 | silica C | 0.5 | 0.80 | 2.2 | 18.3 | 10.8 | 12.5 |
| Comparative Example 5 | A 100 | talc | 0.5 | 1.00 | 2.5 | 39.1 | 15.7 | 15.3 |
| Comparative Example 6 | A 100 | silica B | 1.0 | — | — | 19.9 | 9.8 | 14.2 |
| Comparative Example 7 | A 100 | silica C | 1.0 | — | — | 18.6 | 11.9 | 15.2 |

D 628 (type A), is cut out and one side of it is ground with a 400 mesh file into a flat surface, or in the case of metallic material, a mating member is cut out from a plate to the above size. Then this test piece (test piece B) is fixed to one end of the arm, so that its end contacts the surface of test piece A uniformly and weight is placed on the other end of the arm. Under these conditions, the reciprocating table is reciprocated at approximately 60 cycles/minute with test piece A fixed on it. Following this, the reciprocating sliding wear test is conducted for a certain duration and the weight of the test piece (A) is measured ($W_1$ g). The test conditions are, in case the mating member is plastic, 1.5 kg load, 10,000 reciprocations (condition III), and in case the mating member is metal, 3 kg load, 80,000 reciprocations (condition IV). The amount of wear ($\Delta W$) was obtained from the post-test weight ($W_1$ g) of the dumbbell test piece, according to the following formula.

$$\Delta W\ (g) = W_0(g) - W_1(g) \qquad \text{No. 1}$$

Tensile break elongation

Also, to confirm the decrease in strength of various materials produced, the tensile test according to ASTM D628 was conducted to measure the elongation at break. This test is used for assessment of the problem(s), such as brittleness due especially to the addition of ceramic powder.

The above results are shown in Table 1.

Incidentally, the resins and additives used in the Practical and Comparative Examples were as follows.

Polyacetals A: Polyacetal homopolymer with a melt index of 6.3 (190° C., 1060 g load) (DUPONT DELRIN 500 PNC10).

Polyacetals B: Polyacetal homopolymer with melt index of 6.5 (190° C., 1060 g load) (DUPONT DELRIN 12014NC10)

Silica A: Spherical silica of 0.4–0.6 µm average grain size, ADMAFINE SO-C2 (ADMATEX CO.)

Silica B: Spherical silica of 1.5–2.5 µm average grain size, ADMAFINE SO-C5 (ADMATEX CO.)

Silica C: Spherical silica of 1.0–10.0 µm average grain size, TREFIL E-600 (TORAY, DOW CORNING SILICON CO.)

Alumina: Spherical alumina with an average grain size of 0.8 µm.

Talc: Talc of 0.4–0.6 µm average grain size (plate form), FUJI TALC LMS-300 (FUJI TALC CO.)

As shown in Table 1, the compositions of Practical Examples 1–4 have lower wear coefficients, in the case of both relatively light and heavy loads, as compared to Comparative Examples 1–5. Also, comparison of the composition of Practical Example 1 with those of Comparative Examples 3 and 4 shows a lower wear coefficient for smaller grain size even with the same amount of compounding of spherical silica. In addition, comparison of the composition of Practical Example 1 with that of Comparative Example 5 shows a lower wear coefficient for the composition of Practical Example 1, in which the shape of the grain is spherical, even for the same grain size and amount incorporated.

The compositions of Practical Examples 1–8 have lower amounts of wear in the reciprocation test compared to Comparative Examples 1–7, indicating good wear characteristics, and comparison of Practical Example 1 and Comparative Example 1 shows little decrease of the tensile elongation at break due to the addition of silica and a sufficiently high practical value.

As explained above, the polyacetal composition of this invention has a specific fine ceramic powder compounded with polyacetal resin, therefore, the molded parts made from it have sufficiently good frictional wear properties when used under the conditions of heavy load and repeated friction, regardless of the type of material of the mating member.

To offer polyacetal compositions with which molded parts of sufficiently excellent frictional wear properties that can be manufactured regardless of the type of material of the mating member, when used under the conditions of heavy load and repeated friction.

Fine spherical ceramic powder of 1.0 µm or smaller average grain size, 0.25–15 parts by weight, is compounded with 100 parts by weight of polyacetal resin.

What is claimed is:

1. Polyacetal composition, characterized by a content of 0.25–15 parts by weight of fine spherical ceramic powder of 1.0 µm or smaller average grain size to 100 parts by weight of polyacetal resin.

2. Molded parts, characterized by use of a polyacetal composition containing 0.25–15 parts by weight of fine spherical ceramic powder of 1.0 µm or smaller average grain size to 100 parts by weight of polyacetal resin.

* * * * *